United States Patent [19]

Barr et al.

[11] Patent Number: 4,739,003

[45] Date of Patent: Apr. 19, 1988

[54] AQUEOUS CONDUCTIVIZING COMPOSITION FOR CONDUCTIVIZING SHEET MATERIAL

[75] Inventors: Keith W. Barr, Exeter; Vanessa D. Royston, Herne Bay, both of England

[73] Assignee: The Wiggins Teape Group Limited, Basingstoke, England

[21] Appl. No.: 898,538

[22] Filed: Aug. 21, 1986

[30] Foreign Application Priority Data

Aug. 22, 1985 [GB] United Kingdom ................. 8521194

[51] Int. Cl.[4] .................................................. C08K 3/34

[52] U.S. Cl. ..................................... 524/446; 524/456

[58] Field of Search ................................ 524/446, 456

[56] References Cited

U.S. PATENT DOCUMENTS

| | | | |
|---|---|---|---|
| 3,063,126 | 11/1962 | Etchison . | |
| 3,295,967 | 1/1967 | Schoenfeld . | |
| 3,586,478 | 6/1971 | Neumann . | |
| 3,639,162 | 2/1972 | Bixler . | |
| 3,653,894 | 4/1972 | Levy et al. . | |
| 3,802,880 | 4/1974 | Holden et al. . | |
| 4,173,480 | 11/1979 | Woodward . | |
| 4,336,306 | 6/1982 | Fellows . | |
| 4,436,862 | 3/1984 | Tetenbaum | 524/446 |
| 4,442,242 | 4/1984 | Fogelberg | 524/446 |
| 4,588,649 | 5/1986 | Kriz | 524/446 |
| 4,649,166 | 3/1987 | DeFatis | 524/446 |

FOREIGN PATENT DOCUMENTS

| | | |
|---|---|---|
| 1115183 | 5/1968 | United Kingdom . |
| 1115184 | 5/1968 | United Kingdom . |
| 1115185 | 5/1968 | United Kingdom . |
| 1301926 | 1/1973 | United Kingdom . |
| 1379254 | 1/1975 | United Kingdom . |

OTHER PUBLICATIONS

Laporte Industries Publications, "Laponite Inorganic Colloids", Chemistry & Structure and Laponite-Structure, Properties and Relationship to Natural Clays.

*Primary Examiner*—Paul R. Michl
*Assistant Examiner*—Patrick A. Doody
*Attorney, Agent, or Firm*—Burns, Doane, Swecker & Mathis

[57] ABSTRACT

An aqueous conductivizing composition for conductivizing paper or other sheet material, for example for producing a conductive base for use in dielectric paper or other electrostatic imaging material, is produced by (a) removing sodium magnesium trifluoride impurity (neighborite) from a synthetic hectorite clay conductivizing agent, and (b) adding a binder. These measures reduce dust formation experienced in production or use of electrostatic imaging material incorporating a base which has been conductivized with a synthetic hectorite clay conductivising agent.

13 Claims, No Drawings

AQUEOUS CONDUCTIVIZING COMPOSITION FOR CONDUCTIVIZING SHEET MATERIAL

This invention relates to an aqueous conductivising composition and a method for its production, and to the use of the composition for conductivising paper or other sheet material, for example to produce a base for electrostatic imaging material.

Electrostatic imaging paper, also known as dielectric paper, comprises a conductive base paper carrying a dielectric coating. In use, an electrical charge pattern is applied to the dielectric coating, for example by means of an array of styli or other electrodes, and this charge pattern is then rendered visible to produce an image by the application or a toner material which is normally in the form of a dry powder or a non-aqueous dispersion. The pattern is then fixed to form a permanent image, for example by heating or by removal of solvent. Polymer film or other sheet material may be used as the base for dielectric coating, instead of paper.

The base paper or other sheet material is normally rendered conductive by means of a conductivising agent, applied at the size press or size bath (in the case of paper) or by other coating means (in the case of paper and other sheet materials). Salts, most usually polymeric quaternary ammonium compounds, have generally been used as conductivising agents, but in certain grades of conductivised paper, a conductive synthetic hectorite clay has been used. This synthetic hectorite clay is thought to be in essence a magnesium silicate layered lattice structure in which magnesium ions are bound in octahedral relationship with hydroxyl ions, some of which are replaced by fluoride ions. The layers of the lattice structure carry an electrical charge as a result of substitution of some of the magnesium ions by lithium ions. The electrical charge on the layers is balanced by exchangeable cations, for example sodium ions, disposed between the layers. The production of a conductive clay as just described is disclosed in U.S. Pat. No. 358,478, and the conductive clay product is available from LaPorte Industries, of Widnes, United Kingdom, under the designation "Laponite S".

Whilst the use of a synthetic hectorite clay conductivising agent as described above offers a number of advantages compared with quaternary ammonium conductivising agents, for example lower cost, lower toxicity, greater ease of incorporation into the paper, better conductivisation performance in a low relative humidity environment, and potential suitability for coating with an aqueous dielectric coating composition,it has the drawback that it may give rise to undesirable dust formation during calendering, during the subsequent dielectric coating operation and/or when being used in dielectric printer/plotters.

It is an object of the present invention to eliminate or at least reduce such dust formation.

Initial efforts at prevention of dust formation involved the evaluation of a range of binders (these had not been used hitherto as the synthetic hectorite clay conductivising agent is film-forming in its own right and does not require the use of additional adhesive to bind it to the paper). Whilst in some cases the use of binders did lessen dust formation to some extent, none was found to provide a satisfactory solution to the problem. The surprising discovery was then made that the dust produced was not in fact mainly composed of fine particles of synthetic hectorite clay, as would be expected, but was predominantly made up of another substance not previously known to be present and presumably an impurity, namely sodium magnesium trifluoride, $NaMgF3$, also known as neighborite and referred to hereafter as such. This insight having been arrived at, a potential solution to the dusting problem appeared to be to remove neighborite from the synthetic hectorite clay conductivising agent before use. It was then surprisingly found that far from solving the problem of dust formation, it worsened it, although in this case the dust was predominantly synthetic hectorite clay.

It has now been found that despite the fact that neither the use of a binder nor neighborite removal in themselves ameliorate the problem of dust formation to a worthwhile extent, the use of a binder with a synthetic hectorite clay conductivising agent of the kind described earlier, but from which neighborite has been removed, eliminates or significantly reduces the problem.

Accordingly, the present invention provides in a first aspect an aqueous conducitivising composition for conductivising sheet material, comprising:

(a) a conductivising agent comprising a synthetic hectorite clay which has had neighborite impurity removed and which has a magnesium silicate layered lattice structure in which magnesium ions are bound in octahedral relationship with hydroxyl ions, some of the magnesium ions being replaced by lithium ions and some of the hydroxyl ions being replaced by fluoride ions, and in which exchangeable cations are disposed between the layers of the layered lattice structure, and (b) a binder;

the neighborite removal and the presence of binder being such as to reduce the dusting of the conductivised material.

In a second aspect, the invention provides a method of producing an aqueous conductivising composition comprising:

(a) dispersing in water a conductivising agent comprising synthetic hectorite clay having a magnesium silicate layered lattice structure in which magnesium ions are bound in octahedral relationship with hydroxyl ions, some of the magnesium ions being replaced by lithium ions and some of the hydroxyl ions being replaced by fluoride ions, and in which exchangeable cations are dispersed between the layers of the layered lattice structure;

(b) separating out neighborite impurity from said synthetic hectorite clay;

(c) removing said neighborite from said dispersion; and (d) adding a binder to said dispersion; said neighborite removal and binder addition being such as to reduce the dusting of sheet material conductivised with said aqueous conductivising composition.

In a third aspect, the invention provides a conductive sheet material carrying a coating of a conductivising composition, said conductivising composition comprising a conductivising agent comprising a synthetic hectorite clay which has had neighborite impurity removed and which has a magnesium silicate layered lattice structure in which magnesium ions are bound in octahedral relationship with hydroxyl ions, some of the magnesium ions being replaced by lithium ions and some of the hydroxyl ions being replaced by fluoride ions, and in which exchangeable cations are disposed between the layers of the layered lattice structure, and a binder, the neighborite removal and the presence of binder being such as to reduce the dusting of said conductive sheet material.

In a fourth aspect, the invention provides electrosatic imaging material comprising:

(a) conductive sheet material carrying a coating of a conductivising composition, said conductivising composition comprising a conductivising agent comprising a synthetic hectorite clay which has had neighborite impurity removed and which has a magnesium silicate layered lattice structure in which magnesium ions are bound in octrahedral relationship with hydroxyl ions, some of the magnesium ions being replaced by lithium ions and some of the hydroxyl ions being replaced by fluoride ions, and in which exchangeable cations are disposed between the layers of the layered lattice structure, and a binder; and (b) a dielectric coating on said sheet material;

the neighborite removal and the presence of binder being such as to reduce the dusting of said electrostatic imaging material.

Neighborite removal may be accomplished, for example, by the simple expedient of allowing an aqueous dispersion of synthetic hectorite clay to stand, typically for a period of a few days, for example 4 to 6 days, and decanting the supernatant liquid. The synthetic hectorite clay itself forms a colloidal suspension, and so does not settle out significantly, whereas the neighborite settles very gradually. A suspension of synthetic hectorite clay from which neighborite has been removed will hereafter be referred to as "treated clay". A dispersant, such as tetrasodium pyrophosphate, is normally required to facilitate formation of the initial clay suspension prior to the settling step. An alternative method of removing neighborite is centrifuging. Preferably, as much neighborite impurity as possible is removed from the synthetic hectorite clay.

A variety of binders may be used for prevention of dust formation, although care must be taken to see that the binder is not unsuitable for other reasons, for example because it adversely affects the conductivising properties of the clay, or because it produces an excessively high mix viscosity. Examples of suitable binders are aqueous styrene butadiene latices, aqueous acrylic polymer emulsions, aqueous acrylate/styrene copolymer dispersions, and aqueous poly(vinylidene chloride) suspensions. In some cases, a defoamer may be needed to counteract foaming. The amount of binder required may vary somewhat in dependence on the particular binder being used. Typically, the binder is present in an amount of from 1% to 4%, preferably 2% by weight (based on dry weight of binder in relation to total weight of the aqueous composition). The optimum binder level for any particular binder can of course be simply determined by routine experimentation.

The combination of the amount of neighborite removed and the amount of binder added should be sufficient to reduce dusting in the conductivised material compared with that encountered when using untreated binder-free synthetic hectorite clay.

The present conductivising composition is particularly advntageous for the conductivising of paper, but it may of course also be used for conductivising polymer films or other sheet material intended for use as a base for dielectric coating or for other purposes. The paper, polymer film or other sheet material is normally conductivised whilst it is in web form, i.e. before being cut down into individual sheets. The conductivising agent may be applied by conventional web-coating methods.

In the case of paper, the treated clay/binder admixture may conveniently be incorporated in the paper web by application at the size press or size bath of the paper machine on which the paper to be conductivised is produced. The treated clay suspension may typically have a clay content of about 10 to 15% by weight. The pick-up from the size press or bath should typically be within the range 2 to 4 g $m^{-2}$ on a dry basis (for a treated clay suspension of about 11% solids content) but this will of course depend on the degree of conductivity desired, the paper making and coating conditions, and the treated clay content of the mix.

If it is desired to apply more conductivising agent than can conveniently be applied in a single coating operation, particularly a size press or size bath operation, the web may be given a second pass through the coating station to apply additional conductivising agent.

In the case of paper, as well as applying the treated binder-containing clay by a coating operation, for example at the size press or bath, synthetic hectorite clay suspension, typically with a clay content of about 10% by weight, may be added to the stock from which the paper is made, in order to improve the bulk or volume conductivity of the paper. This synthetic hectorite clay suspension need not be treated to remove neighborite and need not contain a binder, as the use of untreated binder-free synthetic hectorite clay has been found not to give rise to dusting, presumably because the clay is enmeshed within the fibres of the web, rather than being concentrated at or near the surface of the web.

Base papers for dielectric coating may be translucent or opaque and the present conductivising composition may be used for coating either of these. In either case, the base paper is preferably made from fairly wet-beaten stock. If the degree of beating is such as to impart translucency to the paper, the preferred nominal grammage of the paper is of the order of about 70 to about 75 g $m^{-2}$. Alternatively, if the stock, whilst still fairly wet beaten, is such as to give rise to an opaque rather than translucent base paper, the preferred nominal grammage is about 65 to about 70 g $m^{-2}$. The base paper may in either case be calendered so as to enhance its smoothness. The grammage ranges just quoted are not limiting, and papers having a much wider range of grammage, for example 40 to 120 g $m^{-2}$, may be conductivised using the present conductivising solution.

Instead of a natural translucent paper as described above, a chemically transparentized paper may be used.

The dielectric coating applied to the conductivised paper to produce electrostatic imaging paper may be conventional in nature, and may comprise a polymeric material in the form of a resin or latex (the polymeric material may be, for example, a homopolymer or copolymer of vinyl acetate, vinyl chloride, vinylidene chloride, vinyl acetate, an acrylate, a methacrylate, acrylonitrile, ethylene, styrene or butadiene); a pigment for example clay, calcium carbonate, silica, or a synthetic aluminosilicate; and, optionally, a dispersant for the pigment material. The proportion of pigment used may likewise be conventional, for example the pigment may constitute from 10 to 50% by weight of the dielectric coating, on a dry basis.

The dielectric coating may be applied in a solvent vehicle as is conventional in the art. Alternatively, the dielectric coating may be applied as an aqueous dispersion directly to the conductivised base without the need for a sealing pre-coat. This is possible because in contrast to many conventional conductivising agents, a synthetic hectorite clay conductivising agent is substantially water-insoluble, rather than water-soluble. Thus the usual constraint on the use of aqueous dispersions, namely that the conductivising agent may partly dissolve and migrate into the dielectric coating and so reduce its effectiveness, does not apply. A further alternative is the application of an initially liquid radiation-curable dielectric coating, for example of the kind disclosed in UK Patent Specification No. 2016021A.

Conventional coating techniques may be employed for the application of the dielectric coating, for example blade coating, reverse roll coating, Meyer bar coating or offset gravure coating. The coatweight applied is typically within the range 3 to 10 g $m^{-2}$.

The invention will now be illustrated by the following Examples, in which all parts and percentages are by weight unless otherwise stated. It will be understood that the invention is not limited in scope to these examples.

EXAMPLE 1

In this Example, neighborite was removed from synthetic hectorite clay, and a pilot plant coater was used to apply the thus treated clay to paper to conductivise the paper. A variety of binders was used in conjunction with the treated clay, and controls were also run.

(a) Preparation of Synthetic Hectorite Clay Suspension 6 kg of synthetic hectorite clay powder ("Laponite S") were added slowly to 44 kg of water whilst stirring with a high speed high shear stirrer. 1 kg of tetrasodium pyrophosphate ("Tetron" supplied by Albright & Wilson, United Kingdom) was added and stirring was continued until dispersion appeared complete, which took a least 1½ hours.

(b) Removal of Neighborite

The synthetic hectorite clay suspension prepared as just described was allowed to stand for at least 4 days, after which the supernatant was decanted off, leaving a deposit of neighborite.

(c) Binder Addition

A range of different binders were added to treated clay suspensions prepared as just decribed, at a range of different binder addition levels, together with sufficient water to give a solids content of about 10%. The binder levels were 1%, 2% and 4% by weight based on dry weight of binder in relation to total weight of the dispersion. A control mix with no binder addition was also made up.

The binders were:

| | | |
|---|---|---|
| (i) | styrene/butadiene latex I | ("Revinex 98F10", a carboxylated styrene/butadiene latex with a butadiene content of approximately 42%, supplied by Doverstrand Ltd. of Harlow, United Kingdom); |
| (ii) | aqueous acrylic polymer emulsion | ("Rhoplex AC33" supplied by Rohm and Haas); |
| (iii) | styrene/butadiene latex II | ("Dow 675", a carboxylated styrene/butadiene latex of unknown butadiene content supplied by Dow Chemical); |
| (iv) | aqueous polymer dispersion based primarily on polyvinylidene chloride (PVDC) | ("Kurofan 233D", also known as "Diofan 233D" supplied by BASF); |
| (v) | aqueous acrylate/styrene copolymer dispersion | ("Acronal S305 D" supplied by BASF); |

The mix formulation for binders (i), (iii) and (v), which were supplied at a nominal solids content of 50%, was as follows:

| | BINDER LEVEL | | | |
|---|---|---|---|---|
| | 4% | 2% | 1% | 0% (Control) |
| Binder (kg) | 0.8 | 0.4 | 0.2 | — |
| Water (kg) | 2.1 | 2.5 | 2.7 | 2.9 |
| Treated clay from step (b) (kg) | 7.1 | 7.1 | 7.1 | 7.1 |

The mix formulation for binders (ii) and (iv) was the same, except that the amounts of binder and dilution water were adjusted to allow for the fact that the nominal solids content of these binders as supplied was 46–47% and 54–56% respectively.

(d) Incorporation of Treated Clay/Binder in Paper

Each treated clay/binder mixture was coated on to base paper using a three-roll pilot plant coater at a target coatweight of about 2 g $m^{-2}$. The coatweight achieved in some cases was significantly higher than this, but this was not thought to impair comparability of the results obtained to an unacceptable degree. The base paper used was a nominally 70–75 g $m^{-2}$ translucent base paper of a kind conventionally used as the base paper for electrostatic imaging paper and already containing a loading of "Laponite S" synthetic hectorite clay to afford a degree of volume conductivisation.

(e) Evaluation of Conductivised Paper Produced

The machine direction (M.D.) and cross-direction (C.D.) surface resistivities of the paper were measured at 50% relative himidity (RH). These resistivity measurements were carried out using a sullivan T2900 Megohmeter. The applied volage was 100 V and the surface resistivity was calculated from the measured resistance of the sample. The results are expressed in units of Megohm per square (M ohm. $square^{-1}$), a is conventional in this art.

The tendency of the conductivised paper to give rise to dusting was assessed by resting a sponge pad covered with a black cloth on the conductivised web as it passed over the reel-up drum, and maintaining contact of the pad and the web while 100 m of the web passed the pad. This resulted in an accumulation of easily-visible dust on the black cloth. This accumulation was fixed in position using an aerosol varnish spray, and the extent of colour was determined using a Harrison colourmeter. The extent of colouration is related to the amount of dust on the cloth. The colourmeter determines the reflectance of the sample by comparison with the reflectance of a known white standard, and the result is expressed as a percentage. A matt black cloth would thus give a very low figure, and the greater the amount of dust, the greater the % figure obtained.

A qualitative assessment of dusting tendency was also carried out bypassing 50 m sample reels of the various papers through a Versatec V-80 F dielectric printer/plotter and examining the backing electrode of the printer plotter for dust formation.

(f) Controls

Two controls were run, one being an untreated synthetic hectorite clay suspension prepared as described in (a) above i.e. without neighborite removal and without binder, and the other a treated synthetic hectorite clay suspension prepared as described in (b) above, but containing no binder.

(g) Results Obtained

The quantitative results obtained are shown in Table 1 below:

TABLE 1

| Binder type | Binder Level | Coatweight g/m2 | Dusting Tendency % (Black cloth/ Harrison) | Surface Resistivities tested at 50% RH (M ohm · square$^{-1}$) M.D. | C.D. |
|---|---|---|---|---|---|
| None - untreated clay control | | 3.4 | 2.1 | 7.9 | 9.5 |
| None - treated clay control | | 1.8 | 10.6 | 8.2 | 8.7 |
| styrene/butadiene latex I | 1% | 3.4. | 1.6 | 11.3 | 12.4 |
| (i) | 2% | 3.4 | 1.1 | 12.5 | 14.8 |
| | 4% | 2.2 | 0.9 | 22.4 | 26.4 |
| acrylic polymer emulsion | 1% | 2.5 | 1.1 | 9.1 | 11.7 |
| (ii) | 2% | 3.5 | 1.1 | 12.5 | 14.5 |
| | 4% | 3.7 | 1.0 | 21.7 | 27.5 |
| styrene/butadiene latex II | 1% | 2.1 | 1.9 | 9.2 | 13.1 |
| (iii) | 2% | 2.1 | 1.3 | 13.6 | 12.9 |
| | 4% | 2.4 | 1.2 | 20.1 | 21.4 |
| PVDC based dispersion | 1% | 2.6 | 6.0 | 12.2 | 16.5 |
| (iv) | 2% | 2.2 | 1.6 | 17.9 | 16.6 |
| | 4% | 2.6 | 1.4 | 15.1 | 20.3 |
| acrylate/styrene copolymer | 1% | 2.6 | 1.3 | 8.8 | 11.5 |
| dispersion (v) | 2% | 2.6 | 1.2 | 11.3 | 14.7 |
| | 4% | 2.1 | 0.9 | 22.2 | 23.2 |

Examination of the printer/plotter backing electrode showed that there was no dust accumulation with the paper containing acrylic polymer emulsion (binder (ii)), and relatively little dust accumulation, compared with the controls, with the paper containing carboxylated styrene butadiene latex I, (binder (iii), or the acrylate/styrene copolymer dispersion (v). The remaining binders give rise to more dust formation, but were still better than the controls.

(h) Conclusions

The untreated clay control, representing technology which has been commercially practised hitherto, had a black cloth/Harrison dusting tendency of 2.1%, and surface resistivities of the order of 8 or 9. these values constitute standards against which the novel conductivising compositions can be judged, in that a successful composition will have a significantly lower dusting tendency but a resistivity which is comparable to that of the control, or if it is greater, is not so great as to impair functional performance of the paper as a base for electrostatic imaging paper.

It will be seen that all the binder types enable the dusting tendency to be significantly reduced, provided the addition level is appropriately chosen. The printer/plotter evaluation corroborated this finding in relation to two of the binders namely styrene/butadiene latex I ("Revinex 98F10") and the acrylic polymer emulsion ("Rhoplex AC33"). These binders are therefore currently regarded as preferred.

All the binders increased resistivity values to some extent, particularly with higher addition levels, but in all cases it did not exceed the threshold for acceptable performance as a conductivised base.

It will also be noted that the control using treated clay but no binder had an exceptionally high dusting tendency.

It should further be noted that whilst the paper produced in this Example enables the suitability of various binders to be assessed, it would not necessarily be suitable for coating to produce an effective electrostatic imaging paper for all dielectric printer/plotters. This is because the conductivising agent was applied only to one surface of the paper, and many dielectric printer/plotters require the use of a base paper which has been conductivised on both surfaces. Paper conductivised on one surface only is however suitable in so-called "front grounding" dielectric printer/plotters, i.e. printer/plotters in which the "backing electrode" is on the same surface of the sheet as the styli.

EXAMPLE 2

In this Example, the two binders found to be preferred in the evaluation described in Example 1 were used in a full scale papermaking trial. A control using an untreated synthetic hectorite clay suspension was also run.

(a) Preparation of Synthetic Hectorite Clay Suspension 100 kg of synthetic hectorite clay powder ("Laponite S") were slowly added via a water-fed eductor to 227 kg of stirred water in a mixing tank. The eductor served to improve dispersion of the clay and prevent lump formation. Sufficient water to make up the total amount of water in the tank to 772 kg was then added. The temperature of the mixture was then raised to 40° C. by steam heating, and 17 kg of tetrasodium pyrophosphate dispersant were added ("Tetron"). The mixture was then stirred for about 1 hour until dispersion was complete.

(b) Removal of Neighborite

This was carried out as decribed for Example 1.

(c) Binder Addition

Binder additions were made to give a binder level of 2% by weight, based on dry weight of binder in relation to total weight of dispersion, i.e. 36 kg of binder at about 50% solids content were added.

(d) Incorporation of Treated Clay/Binder in Paper

The treated clay/binder admixture was then applied to paper of the kind described in Example 1 by means of a size bath forming part of the paper machine being used to produce the paper.

Evaluation of Conductivised Paper Produced

The surface resistivity and dusting tendency of each of the papers were measured as described in the previous Example, and the mean results obtained are shown in Table 2 below:

TABLE 2

| Binder type | Dusting Tendency % Black cloth/ Harrison | Surface Resistivities (50% RH) (M Ohm · square$^{-1}$) M.D. | C.D. |
|---|---|---|---|
| None - untreated clay control | 4.0 | 6.9 | 8.0 |
| carboxylated styrene/ butadiene latex I (i) | 2.4 | 11.9 | 17.0 |
| acrylic polymer emulsion (ii) | 2.2 | 10.7 | 14.7 |

On running 50 m samples of each of the papers produced through a Versatex V-80F dielectric printer/-plotter, it was found that the control paper gave rise to considerable dust formation on the backing electrode, whereas no dust formation was observed with either of the samples conductivised with treated clay/binder.

The suitability of the treated clay/binder conductivised samples for use as a base for dielectric coating was then assessed by coating sheets of the papers with the dielectric coating mix detailed below. A laboratory Meyer bar coater was used for this purpose, and the coatweight was 8-10 g m$^{-2}$.

The dielectric coating had the following constituents:

| Constituent | Parts by weight |
|---|---|
| Toluene (solvent vehicle) | 11.1 |
| calcium carbonate | 48.5 |
| acrylic polymer | 40.4 |
| | 100.0 |

The thus coated papers were then tested in a dielectric printer, and a satisfactory print was obtained.

EXAMPLE 3

This illustrates the use of the invention for conductivising opaque paper rather than the translucent paper used in the previous Examples. The binder used was the aqueous acrylic polymer emulsion described in Example 1 (i.e. "Rhoplex AC33", binder (ii)). No control run was carried out, as earlier attempts to use an untreated synthetic hectorite clay suspension with opaque base paper had produced excessive dusting during calendering.

(a) Preparation of Synthetic Hectorite Clay Suspension

This was carried out as described for Example 2.

(b) Removal of Neighborite

This was carried out as described for Example 1.

(c) Binder Addition

Binder additions were made to give levels as described for Example 2.

(d) Incorporation of Treated Clay/Binder in Paper

The treated clay/binder admixture was applied to a nominally 65 g m$^{-2}$ opaque base paper which, unlike the translucent base paper used in the previous Examples, did not already contain a loading of synthetic hectorite clay. The admixture was applied by means of a size bath incorporated in the paper machine being used to produce the paper.

(e) Evaluation of Conductivised Paper Produced

The surface resistivity (M.D.) and dusting tendency of the paper were measured as described in Example 1, and the mean results obtained are shown in Table 3 below.

| Binder type | Dusting Tendency % (Black cloth/ Harrison) | Surface Resistivity (M.D. at 50% RH) (M ohm · square$^{-1}$) |
|---|---|---|
| acrylic polymer emulsion | 2.1 | 20.7 |

This result was similar to that obtained for the same binder in Example 2 and, as in Example 2, the passage of 50 m of the paper through a Versatec V-80F dielectric printer/plotter left no dust formation on the backing electrode.

The paper was tested for suitability as a dielectric base by coating with a dielectric coating mix as described in Example 2 and using a dielectric coatweight of 8 g m$^{-2}$. The coated paper was tested in a Versatec V-80F dielectric printer/plotter and a satisfactory print was obtained.

EXAMPLE 4

This illustrates the application of a double coating of conductivising composition.

A web of paper of the kind used in Example 1 was conductivised by application of a treated clay/binder admixture as described in Example 2 by means of a size bath forming part of the paper machine being used to produce the paper. The paper was calendered conventionally and then run through the size bath a second time to apply a second cooating of the treated clay/-binder admixture. The dry pick-up during the second pass through the size bath was 2.3 g m$^{-2}$.

The machine-direction surface resistivity of the paper was measured both before and after the second pass through the size bath, and values of 11.4 M ohm square$^{-1}$ and 4.5 M ohm square$^{-1}$ respectively were obtained, i.e. there was a marked improvement in conductivity after the second conductivising operation. In other respects, the properties of the paper before and after the second coating operation were similar.

EXAMPLE 5

This example illustrates the application to translucent and opaque papers of synthetic hectorite clay suspension from which neighborite has been removed by the process of centrifugation rather than settlement.

(a) Preparation of Synthetic Hectorite Clay Suspension

This was carried out as described for Example 2.

(b) Removal of Neighborite

This was achieved by passing the untreated synthetic hectorite clay suspension through a long bowl super-centrifuge (a Sharples AS-16 model super-centrifuge supplied by Pennwalt Ltd. of Camberley, UK) at a rate of 15 l $min^{-1}$ with a bowl speed of 15,000 r.p.m.

(c) Binder Addition

The binder used was the aqueous acrylic polymer emulsion referred to in Example I and the binder additions were made to give levels as described for Example 2.

(d) Incorporation of Treated Clay/Binder in Translucent Paper

The treated clay/binder admixture was applied to paper of the kind described in Example 1 by means of a size bath forming part of the machine being used to produce the paper.

(e) Incorporation of Treated Clay/Binder in Opaque Paper

The treated clay/binder admixture was also applied to paper of the kind described in Example 3 by means of a size bath incorporated in the machine being used to make the paper. The paper was calendered conventionally.

(f) Evaluation of Translucent Conductivised Paper Produced

The surface resistivity and dusting tendency of the translucent paper produced was measured as described in Example 1 and the results are given in Table 4 below.

TABLE 4

| | | Surface Resistivity ($M \cdot Ohm \cdot square^{-1}$) | |
|---|---|---|---|
| | Dusting Tendency % | MD | CD |
| Translucent Conductivised Base | 1.9 | 11.8 | 16.1 |

It can be seen that the paper showed dusting and resistivity properties of the same order as those obtained in Example 2 where the neighborite removal was by settlement.

(g) Evaluation of Opaque Paper Produced

The surface resistivity of the opaque paper was measured as in previous examples, the average M.D. and C.D. values being 12.9 and 17.9 M.Ohm $square^{-1}$ respectively. The black cloth test for dusting tendency was not carried out on this occasion but dusting during calendering was negligible compared to that previously encountered when using untreated synthetic hectorite clay.

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An aqueous conductivising composition for conductivising sheet material, comprising:

(a) a conductivising agent comprising a synthetic hectorite clay which has had neighborite impurity removed and which has a magnesium silicate layered lattice structure in which magnesium ions are bound in octahedral relationship with hydroxyl ions, some of the magnesium ions being replaced by lithium ions and some of the hydroxyl ions being replaced by fluoride ions, and in which exchangeable cations are disposed between the layers of the layered lattice structure; and (b) a binder;

the neighborite removal and the presence of binder being such as to reduce the dusting of the conductivised material.

2. The aqueous conductivising composition of claim 1, wherein said conductivising agent constitutes from 10 to 15% by weight of said composition and said binder is present in an amount of from 1 to 4%, based on the dry weight of binder in relation to the total weight of the aqueous composition.

3. The aqueous conductivising composition of claim 2, wherein said binder is present in an amount of 2%, based on the dry weight of binder in relation to the total weight of the aqueous composition.

4. The aqueous conductivising composition of claim 1, wherein said binder is selected from the group consisting of an aqueous styrene butadiene latex, an aqueous acrylic polymer emulsion, an aqueous acrylate/styrene copolymer dispersion, and an aqueous poly(vinylidene chloride) suspension.

5. The aqueous conductivising composition of claim 1, further comprising:

a defoamer;

a dispersant;

or a mixture thereof.

6. A method of producing an aqueous conductivising composition comprising:

(a) dispersing in water a conductivising agent comprising synthetic hectorite clay having a magnesium silicate layered lattice structure in which magnesium ions are bound in octahedral relationship with hydroxyl ions, some of the magnesium ions being replaced by lithium ions and some of the hydroxyl ions being replaced by fluoride ions, and in which exchangeable cations are dispersed between the layers of the layered lattice structure;

(b) separating out neighborite impurity from said synthetic hectorite clay;

(c) removing said neighborite from said dispersion; and (d) adding a binder to said dispersion;

said neighborite removal and binder addition being such as to reduce the dusting of sheet material conductivised with said aqueous conductivising composition.

7. The method of claim 6, wherein said neighborite impurity is separated out by settling or by centrifuging.

8. The method of claim 6 wherein said conductivising agent is dispersed in an amount of from 10% to 15% by weight of said composition and said binder is added in an amount of from 1% to 4%, based on the dry weight of binder in relation to the total weight of said aqueous composition.

9. The method of claim 8, wherein said binder is added in an amount of 2% based on the dry weight of binder in relation to the total weight of said aqueous composition.

10. The method of claim 6 wherein said binder is selected from a group consisting of an aqueous styrene butadiene latex, an aqueous acrylic polymer emulsion, an aqueous acrylate/styrene copolymer dispersion, and an aqueous poly(vinylidene chloride) suspension.

11. The methosd of claim 6, wherein in said step (a), a dispersant is added.

12. The method of claim 11, wherein said dispersant is tetrasodium pyrophosphate.

13. The method of claim 6, wherein in said step (d) a defoamer is added.

* * * * *